May 12, 1931.  E. L. YOUNG  1,805,323
HEDGE TRIMMER
Filed July 25, 1930
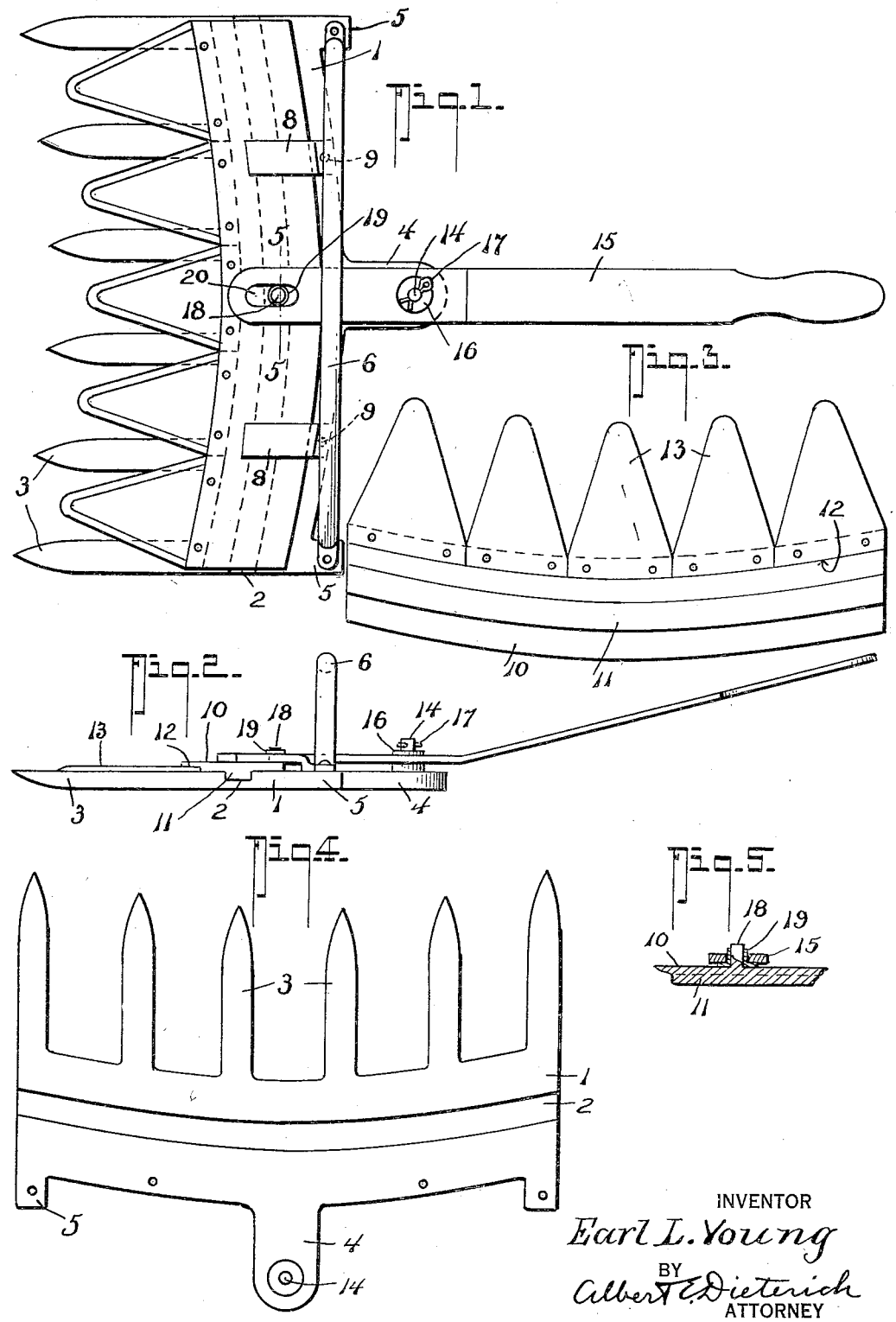
INVENTOR
Earl L. Young
BY
Albert E. Dieterich
ATTORNEY Patented May 12, 1931

1,805,323

UNITED STATES PATENT OFFICE

EARL L. YOUNG, OF SAN FERNANDO, CALIFORNIA

HEDGE TRIMMER

Application filed July 25, 1930. Serial No. 470,701.

My invention relates to implements for trimming hedges and it particularly has for its object to provide a well balanced hedge trimmer that may be held by the left hand and guided and operated by a handle in the right hand of the user.

Further, it is an object to provide an implement for the purposes mentioned which is light, compact, inexpensive to manufacture, easy to operate at any desired angle, and one which will effectively serve its intended purposes.

Further, it is an object to provide a hedge trimmer wherein the cutter bar has a curvilinear motion, holding and severing twigs with less operating exertion than ordinary trimmers having the cutter bar reciprocating in a rectilinear direction.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawings, in which:—

Figure 1 is a plan view of the implement.

Figure 2 is a side elevation thereof.

Figure 3 is an inverted plan of the cutter bar.

Figure 4 is a plan of the base and finger member.

Figure 5 is a detail section on the line 5—5 of Figure 1.

In the drawings, in which like numerals of reference indicate like parts in all of the figures, 1 represents the base which is preferably made of cast metal and is provided with a curved or arcuate groove 2 on its upper face and with fingers 3 projecting forwardly preferably parallel to each other. The fingers 3 are preferably convex on their under sides and flat on top.

The base is also provided with a central rearwardly projecting short arm 4 and with rearwardly projecting end lugs 5, the latter serving as means on which to mount the holding handle 6 which extends above and across the implement from lug to lug.

8 designates knife bar holding down lugs secured to the base 1 and 9 represents a means for securing these lugs 8 to the base, the means employed being preferably screws.

The knife bar 10 is preferably arcuate and has an arcuate tongue 11 to fit into the groove 2. It also has a flat groove or recess 12 to receive the butt ends of the blades 13, the latter being preferably riveted or otherwise suitably secured to the knife bar with their lower faces flush with the lower face of the knife or cutter bar so that the knives will lie flat against the flat tops of the fingers 3 and extend between the same.

14 is a pivot stud for the operating handle 15, a washer 16 and cotter pin 17 being provided to hold the handle on the pivot stud.

The knife or cutter bar is also provided with a stud 18 on which is a roller sleeve 19 to fit into the slot 20 of the operating handle lever 15.

When the parts are assembled, the operator holds the implement by the holding handle and guides it by the operating handle. By oscillating the operating handle an oscillating motion is imparted to the cutter bar in the direction of curvature of the tongue and groove connection between the cutter bar and the base. This oscillating motion increases the draw cut effect between the knives and the fingers and adds to the efficiency of operation of the machine.

In my invention I have considered the almost prohibitive weight and tiring effort to trim a hedge with the ordinary hedge trimming shears with all the weight on the end of the holding handles. My implement has been so constructed that the holding handle is over the trimmer and the implement will be held in position by the left hand and guided by the operating handle and right hand to the advantage that the implement is held steadier, and is easier to hold in position than a machine or implement having holding handles on the rearward side of the base. My implement is also adapted for left handed persons. They may grasp the holding handle with the right hand and operate the lever with the left hand.

From the foregoing description, taken in connection with the accompanying drawings, it is thought the complete construction, operation and advantages of my invention will be clear to those skilled in the art to which the invention relates.

What I claim is:

1. In hedge trimmers, a base having fingers extending forwardly therefrom, a cutter bar extending laterally of the base and having a plurality of cutting blades overlying said fingers, said bar and said base having tongue and groove connection of curvilinear form, and means to move said cutter bar in the curvilinear direction for the purposes described.

2. In hedge trimmers, a base having forwardly projecting fingers and a laterally extending arcuate groove, a cutter bar held on said base and having a laterally extending arcuate tongue lying in said groove, forwardly extending knives carried by said cutter bar and cooperating with said fingers, said base having rearwardly extending side lugs, and a holding handle secured to said lugs, and means to effect oscillation of said cutter bar.

3. In hedge trimmers, a base having forwardly projecting fingers and a laterally extending arcuate groove, a cutter bar held on said base and having a laterally extending arcuate tongue lying in said groove, forwardly extending knives carried by said cutter bar and cooperating with said fingers, said base having rearwardly extending side lugs, a holding handle secured to said lugs, and means to effect oscillation of said cutter bar, said means comprising a rearwardly projecting central base lug, an operating handle lever fulcrumed to said central base lug and cooperatively connected to said cutter bar.

4. In hedge trimmers, a base plate having a plurality of forwardly extending fingers and a laterally extending arcuate guide channel, a cutter bar with knives overlying said base and fingers and having a laterally extending arcuate guide tongue located in said channel, a laterally extending holding handle secured to said base plate and extending in a plane above said base plate, an operating handle fulcrumed on an axis normal to the base plate and having a pin and slot connection with said cutter bar for oscillating said cutter bar along said guide channel.

5. In hedge trimmers, a laterally elongated base having a concaved front edge and a plurality of laterally spaced fingers projecting forwardly of said edge, a laterally elongated cutter bar overlying the base and having its front edge similarly concaved, a plurality of flat cutting blades forwardly projecting from the front end of said cutter bar and overlying said fingers to cooperate therewith, a laterally disposed elevated handle member secured to the base, a lever pivoted to the base to the rear of the handle member and connected to said cutter bar in front of the handle member for oscillating said cutter bar laterally of the base, and a connection between said cutter bar and said base to enable said cutter bar to move laterally over said base in an arc.

6. In hedge trimmers, a laterally elongated base having a concaved front edge and a plurality of laterally spaced fingers projecting forwardly of said edge, a laterally elongated cutter bar overlying the base and having its front edge similarly concaved, a plurality of flat cutting blades forwardly projecting from the front edge of said cutter bar and overlying said fingers to cooperate therewith, a laterally disposed elevated handle member secured to the base, a lever pivoted to the base to the rear of the handle member and connected to said cutter bar in front of the handle member for oscillating said cutter bar laterally of the base, and a connection between said cutter bar and said base to enable said cutter bar to move laterally over said base in an arc, said last named means comprising a lateral slot in the base concentric with the concaved front edge thereof, and a corresponding tongue on the cutter bar lying in said slot, and lugs on said base overlying said cutter bar.

7. In hedge trimmers, a laterally elongated base having a concaved front edge and a plurality of laterally spaced fingers projecting forwardly of said edge, a laterally elongated cutter bar overlying the base and having its front edge similarly concaved, a plurality of flat cutting blades forwardly projecting from the front edge of said cutter bar and overlying said fingers to cooperate therewith, a laterally disposed elevated handle member secured to the base, a lever pivoted to the base to the rear of the handle member and connected to said cutter bar in front of the handle member for oscillating said cutter bar laterally of the base, and a connection between said cutter bar and said base to enable said cutter bar to move laterally over said base in an arc, said cutter bar having a recess along its front edge on its under face into which said cutting blades are set, and means securing said blades in said recess to said cutter bar.

EARL L. YOUNG.